United States Patent
Gunnar et al.

(10) Patent No.: US 10,211,619 B2
(45) Date of Patent: Feb. 19, 2019

(54) SIGNAL HANDLING FOR INACCESSIBLY LOCATED POWER EQUIPMENT

(71) Applicant: ABB Technology Ltd, Zürich (CH)

(72) Inventors: Johan Gunnar, Frekhaug (NO); Carlo Coppo, Würenlingen (CH); Herbert Schmid, Hägglingen (CH); Kai Hansen, Oslo (NO); Roberto Celli, Neuenhof (CH)

(73) Assignee: ABB SCHWEIZ AG, Baden (CH)

( * ) Notice: Subject to any disclaimer, the term of this patent is extended or adjusted under 35 U.S.C. 154(b) by 202 days.

(21) Appl. No.: 15/191,250

(22) Filed: Jun. 23, 2016

(65) Prior Publication Data
US 2016/0380423 A1  Dec. 29, 2016

(30) Foreign Application Priority Data
Jun. 25, 2015  (EP) .................................... 15173902

(51) Int. Cl.
*H02H 3/00* (2006.01)
*H02H 3/04* (2006.01)
(Continued)

(52) U.S. Cl.
CPC ................ *H02H 3/04* (2013.01); *H02G 9/02* (2013.01); *H02H 3/38* (2013.01); *H02H 1/0007* (2013.01)

(58) Field of Classification Search
CPC .................................... H02H 3/04; H02H 3/38
(Continued)

(56) References Cited

U.S. PATENT DOCUMENTS

| 5,859,590 A | 1/1999 | Otani |
| 5,940,046 A | 8/1999 | Saleem |

(Continued)

FOREIGN PATENT DOCUMENTS

| EP | 2 302 479 A2 | 3/2011 |
| EP | 2657723 A1 | 10/2013 |

(Continued)

OTHER PUBLICATIONS

Svensson, "Using CompactRIO for Control and Measurement in the Low-Voltage Marine Substation at the Lysekil Wave Power Research Site", National Instruments, prior to Feb. 6, 2013, https://www.patentest.com/ptimg/a931c322-89bc-46db-af12-3b7d7bc3fbda.
(Continued)

*Primary Examiner* — Thienvu Tran
*Assistant Examiner* — Lucy Thomas
(74) *Attorney, Agent, or Firm* — Birch, Stewart, Kolasch & Birch, LLP

(57) ABSTRACT

A protection arrangement for inaccessibly located power distribution equipment includes a first enclosure with power equipment and sensors, a second enclosure adjacent the first enclosure and including a signal handling device, at least one sealed electrical conductor passage between the first and second enclosures, each comprising at least one penetrator through the walls of the first and second enclosures. The signal handling device in the second enclosure is connected to the sensors in the first enclosure via electrical conductors passing through said sealed electrical conductor passages and to an external protection device via a communication link. The signal handling device receives electrical sensor signals from the sensors and shapes them for submission to the external protection device.

18 Claims, 2 Drawing Sheets

(51) Int. Cl.
*H02G 9/02* (2006.01)
*H02H 3/38* (2006.01)
*H02H 1/00* (2006.01)

(58) Field of Classification Search
USPC .......................................................... 361/88
See application file for complete search history.

(56) References Cited

U.S. PATENT DOCUMENTS

| | | |
|---|---|---|
| 2001/0029433 A1 | 10/2001 | Scott |
| 2008/0144442 A1 | 6/2008 | Combee et al. |
| 2014/0035504 A1 | 2/2014 | Rongve et al. |
| 2014/0098468 A1* | 4/2014 | Boe .................... H02G 1/10 |
| | | 361/601 |
| 2014/0117812 A1* | 5/2014 | Hajati .................. B06B 1/0276 |
| | | 310/314 |
| 2014/0139350 A1 | 5/2014 | Cook, II et al. |
| 2014/0365835 A1 | 12/2014 | Hu et al. |

FOREIGN PATENT DOCUMENTS

| | | |
|---|---|---|
| GB | 2463487 A | 3/2010 |
| WO | WO 2006/099362 A1 | 9/2006 |
| WO | WO 2012/041528 A1 | 4/2012 |
| WO | WO 2012/136486 A1 | 10/2012 |

OTHER PUBLICATIONS

European Office Action, dated Nov. 7, 2018, for European Application No. 15173902.6.

* cited by examiner

SIGNAL HANDLING FOR INACCESSIBLY LOCATED POWER EQUIPMENT

FIELD OF INVENTION

The present invention generally relates to installations at inaccessible locations such as subsea installations. More particularly the present invention relates to a protection arrangement for power equipment at such inaccessible locations.

BACKGROUND

It is at times of interest to place electric power equipment at inaccessible locations or hostile environments such as on the sea bed, in a well, a mine, a cave or a pit, for instance for providing power for other equipment used in oil and gas production.

In this case electric or electronic equipment, such as transformers, frequency converters, switchgears etc. may be placed in one or more enclosures in the hostile environment.

The equipment does sometimes need to be controlled in order to perform a required functionality, such as in order to deliver electric power of a distribution system. This type of control is often termed process control. Sensor signals are then collected from the inaccessibly located equipment and used for control purposes.

US 2014/0035504 does for instance describe the collection of signals subsea and transmitted to a topside controller via a fiber-optic link for process control.

Also protection functions and/or protection devices may need to be installed. It may for instance be needed a protection device for swift disconnection of loads connected to a power equipment such as a switchgear.

Local protection of subsea equipment has been known to have been used in relation to Wave Power Generation.

In order to be able to perform a protective function the protection device will then act on sensor measurements obtained in the equipment.

The sensor signals do then sometimes need to be of good quality in order for the protection function to be able to handle them properly. This may especially be a problem if the environment is noisy.

Such signals may have a wide range and low level sensor signal are therefore sensible to noise.

Furthermore, maintenance is typically also a problem at inaccessible locations. It may for instance be virtually impossible to perform repair at an inaccessible site. Maintenance would then typically require the replacement of whole modules. There may therefore also be a need for a protective arrangement that simplifies replacement of parts of it.

There is thus room for improvement in relation to protection of subsea equipment.

SUMMARY OF THE INVENTION

One object of the present invention is to provide an improved protection arrangement.

This object is achieved through a protection arrangement for inaccessibly located power distribution equipment, the arrangement comprising:

a first enclosure comprising power equipment and a group of sensors sensing physical properties of the power equipment, the first enclosure being sealed thereby providing a closed environment for the power equipment, and a signal handling device connected to at least some of the sensors and to an external protection device via a communication link passing through at least one sealed communication link passage, the signal handling device being configured to receive electrical sensor signals from the sensors and shape them for submission to the external protection device.

The present invention has a number of advantages. It increases signals quality and performance of inaccessibly located protection devices, by converting from noise sensitive signals to noise resistant signals close to source, it simplifies penetrators by reducing the number of special signals that needs to be routed and through combining many sensor signals on one communication link.

BRIEF DESCRIPTION OF THE DRAWINGS

The present invention will in the following be described with reference being made to the accompanying drawings, where FIG. 1 schematically shows a subsea installation connected to a land installation via a cable, FIG. 2 schematically shows a power delivery device at the land installation connected to a switchgear in the subsea installation as well as a subsea protection device also connected to the switchgear, FIG. 3 schematically shows sensors for the switchgear in a first enclosure adjacent a second enclosure comprising a signal handling device connected to the protection device via a communication link, FIG. 4 schematically shows a penetrator.

DETAILED DESCRIPTION OF THE INVENTION

In the following, a detailed description of preferred embodiments of a protective arrangement according to the present invention will be given.

Figure 1:
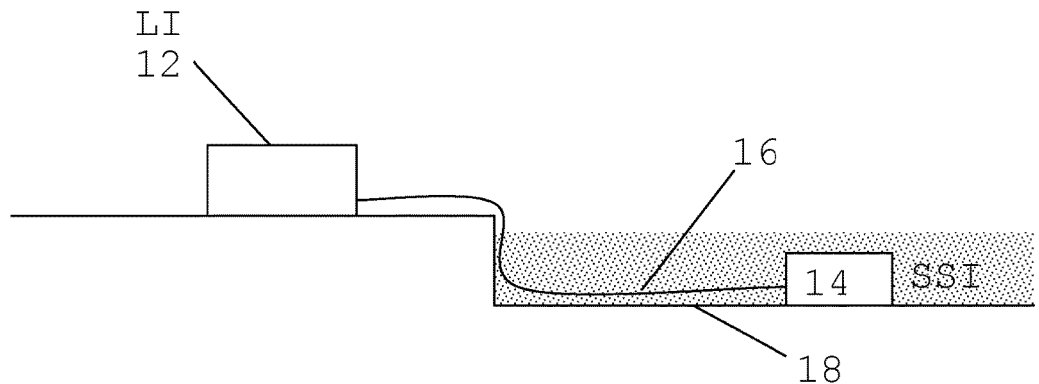

FIG. 1 shows a land installation LI 12 connected to an electric subsea installation SSI 14 on a sea bed 18 via a cable 16. The cable may have two purposes. It provides power for machinery in the electric installation as well as provides a signal path for control and condition monitoring of the equipment in the subsea installation. The land installation 12 may therefore comprise power transmission equipment as well as control and condition monitoring equipment. The installation 12 does not have to be a land installation. It may be an off-shore facility, fixed or floating, which supplies power to the subsea installation 14.

The subsea installation 14 may comprise a number of pieces of electric power equipment. It may for instance comprise motor drives, variable sped drives, variable frequency converters, transformers, etc. In order to provide the power to various such equipment, the subsea installation may also comprise power distribution equipment or power equipment, such as a switchgear, which distributes the power delivered by the land installation LI.

Figure 2:
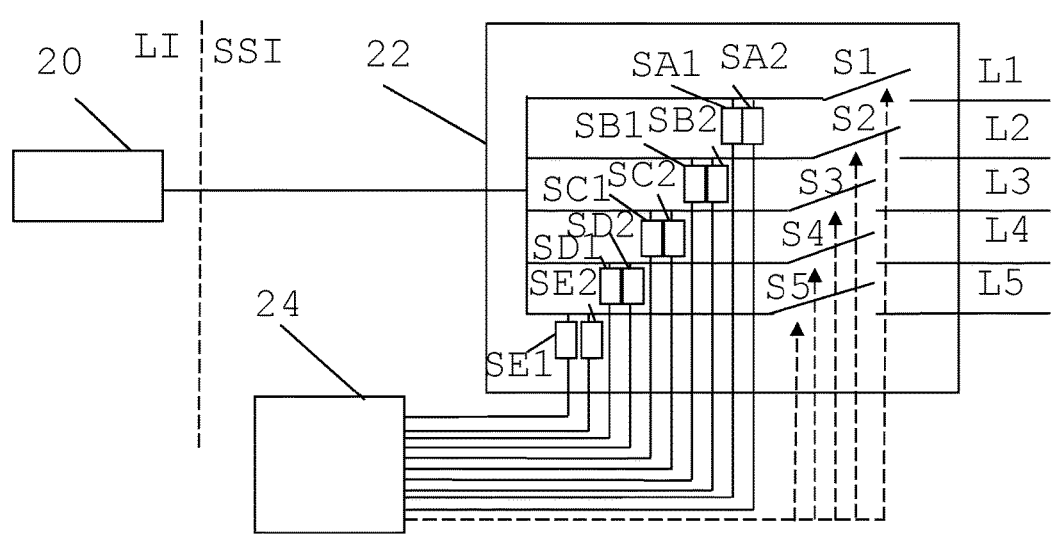

FIG. 2 shows a block schematic of an exemplifying such switchgear 22 at the subsea installation SSI and connected to power transmission equipment 20 in the land installation LI. In this example the switchgear 22 distributes power to five different loads, which may be five different pieces of subsea equipment (not shown) and therefore the switchgear 22 comprises a busbar connected to five power supply lines $L_1$, $L_2$, $L_3$ $L_4$ and $L_5$ via corresponding protective elements, here in the form of switches $S_1$, $S_2$, $S_3$, $S_4$ and $S_5$.

In FIG. 2 there is also a local protection controller or protection device 24 shown as emitting control signals to the protective elements, i.e. the switches $S_1$, $S_2$, $S_3$, $S_4$ and $S_5$. The protection device 24 is provided for protection purposes. Therefore it receives sensor signals from a group of sensors sensing physical properties of the power equipment for instance for handling various fault situations. The protection device 24 therefore receives sensor measurements from the switchgear 22 in relation to each of the power supply lines $L_1$, $L_2$, $L_3$, $L_4$ and $L_5$. The group of sensors comprise primary and secondary sensor $SA_1$ and $SA_2$ connected to a first power supply line $L_1$ at the first switch $S_1$, a primary and secondary sensor $SB_1$ and $SB_2$ connected to a second power supply line $L_2$ at the second switch $S_2$, a primary and secondary sensor $SC_1$ and $SC_2$ connected to a third power supply line $L_3$ at the third switch $S_3$, a primary and secondary sensor $SD_1$ and $SD_2$ connected to a fourth power supply line $L_4$ at the fourth switch $S_4$ and a primary and secondary sensor $SE_1$ and $SE_2$ connected to a fifth power supply line $L_5$ at the fifth switch $S_5$.

The sensors are in this case analogue sensors sensing the physical properties of the power supply lines. The primary sensors may as an a example be current sensors, for instance implemented as Rogowski coils or current transformers, while the secondary sensors may be voltage sensors, for instance implemented as voltage transformers or through resistive voltage division networks. As can be seen in the disclosed embodiment all of these sensors are connected to the protection device 24. In the drawing the sensors are furthermore shown as being separately connected to the protection device 24.

It should be realized that there may sensors at other locations in the switchgear, such as at the busbar.

It should furthermore be realized that measurement of the electrical properties of the switchgear connected to the power supply lines are only examples of physical properties that may be measured. It is for instance also possible to measure other properties such as pressure and temperature in the switchgear 22. These properties do then also not have to be associated with an electrically conductive part of the switchgear, such as a switch connected to a power supply line.

In such inaccessible locations, such as subsea, the power equipment 22 like the switchgear is typically placed in a sealed enclosure such as a tank and providing a closed environment for the power equipment and surrounded by an insulating medium such as transformer oil, which in the case of a subsea installation subjected to the local ambient pressure, i.e. the pressure on the seabed.

However, the controller or protection device 24 may not function well in such an environment but may be required to be surrounded by another insulating medium such as nitrogen. It may also be too delicate for the subsea pressure. It may thus need to be at another pressure, such as at atmospheric pressure, like the pressure of 1 atmosphere. Furthermore there is sometimes a requirement of redundancy in that two protection devices may operate in parallel on the same signals. Both protection devices may then need to receive the sensor measurements.

In order to provide the signals from the sensors to a protection device, it is then important that the conductors carrying the signals are hermetically sealed when leaving the tank and also hermetically sealed when entering an area where they are further treated, which area may be a sealed enclosure in which the protection device is provided, which enclosure is typically a canister.

Such sealing is traditionally provided through the use of penetrators. If it is supposed to be possible to disconnect the protection device from the power equipment, also wet mates may be needed, i.e. connectors specifically developed for liquid environments, such as subsea. Such penetrators and wet mates are expensive and it is therefore of interest to keep their number at a minimum.

Another requirement that may exist is that the enclosure with the protection device should be distinctly separated from the enclosure with the power equipment. This may be needed, for instance in order to simplify maintenance or replacement of either of the protection device and power equipment or both. At times it may even be of interests to keep the protection device in the land installation, which simplifies maintenance significantly. At other times the protection device may have to be located at the sea bed because otherwise the distance between the electric equipment and the protection device may become too long for obtaining effective protection. The protection device may thus at times also need to be placed subsea.

Another problem that may exist is that the sensors may need to cover a wide range of the measured physical property. This in turn means that the sensor signals may be sensitive to noise at low signal levels. If the distance between the protection device and the sensor is too long, the electrical inference may become too high. This means that it may not be possible to detect some of the signals.

There is thus a need to address one or more of the above mentioned problems.

The invention is directed towards addressing these issues through proving a protection arrangement with signal handling at the enclosure comprising the power equipment and then supplying signals that have been shaped for improving reliability to a protection device that is separated from both the enclosure with the equipment and the signal handling.

Thereby the noise sensitive signals are treated as close as possible to the enclosure comprising the power equipment in order to retain as much content of the signal as possible. At the same time the protection device is separated from this enclosure in order to simplify replacement without having to replace the whole arrangement, which may furthermore not be possible because the monitored electric equipment may be connected to further electric equipment.

In embodiments of the invention this separation of signal handling from the protection function may be achieved without having to increase the number of penetrators. In the case of redundancy it is even possible that the number of penetrators can be reduced.

How this may be possible to obtain will now be described in more detail with reference also being made to FIGS. 3, 4 and 5.

Figure 3:
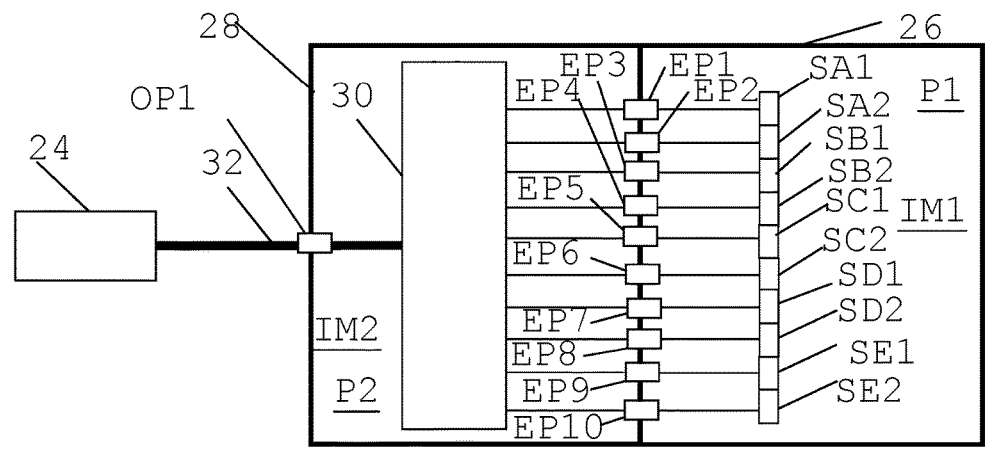

FIG. 3 schematically shows the sensors $SA_1$, $SA_2$, $SB_1$, $SB_2$, $SC_1$, $SC_2$, $SD_1$, $SD_2$, $SE_1$ and $SE_2$ in the first enclosure 26. In the figure it can also be seen that there is a second sealed enclosure 28 adjacent the first enclosure 26. The first and second enclosures are thus placed at the same inaccessible location. As was stated earlier, the first enclosure 26 may be a tank. The second enclosure 26 may on the other hand be realized in the form of a canister and comprises a signal handling device 30. The first enclosure 26 may therefore be significantly larger than the second enclosure 28 and for instance at least ten times as large. The signal handling device 30 may also be provided on a circuit board typically with other entities. Furthermore, the signal handling device 30 is connected to the sensors in the first enclosure 26 via corresponding conductors. There is thus one conductor per sensor. In order to lead the conductors from the sensors to the signal handling device 30 there are a number of sealed electrical conductor passages between the two enclosures, where the number may be as few as one. A sealed electrical conductor passage does in this case comprise one or more penetrators. There may more particularly be one sealed electrical conductor passage per conductor.

There is thus a first sealed electrical passage $EP_1$ for the conductor that interconnects the primary sensor $SA_1$ of the first power supply line $L_1$ with the signal handling device 30, a second sealed electrical passage $EP_2$ for the conductor that interconnects the secondary sensor $SA_2$ of the first power supply line $L_1$ with the signal handling device 30, a third sealed electrical passage $EP_3$ for the conductor that interconnects the primary sensor $SB_1$ of the second power supply line $L_2$ with the signal handling device 30, a fourth sealed electrical passage $EP_4$ for the conductor that interconnects the secondary sensor $SB_2$ of the second power supply line $L_2$ with the signal handling device 30, a fifth sealed electrical passage $EP_5$ for the conductor that interconnects the primary sensor $SC_1$ of the third power supply line $L_3$ with the signal handling device 30, a sixth sealed electrical passage $EP_6$ for the conductor that interconnects the secondary sensor $SC_2$ of the third power supply line $L_3$ with the signal handling device 30, a seventh sealed electrical passage $EP_7$ for the conductor that interconnects the primary sensor $SD_1$ of the fourth power supply line $L_4$ with the signal handling device 30, an eighth sealed electrical passage $EP_8$ for the conductor that interconnects the secondary sensor $SD_2$ of the fourth power supply line $L_4$ with the signal handling device 30, a ninth sealed electrical passage $EP_9$ for the conductor that interconnects the primary sensor $SE_1$ of the fifth power supply line $L_5$ with the signal handling device 30 and a tenth sealed electrical passage $EP_{10}$ for the conductor that interconnects the secondary sensor $SE_{21}$ of the fifth power supply line $L_5$ with the signal handling device 30.

Figure 4:
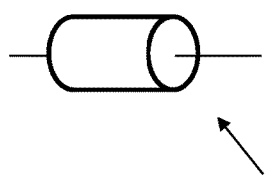
Figure 5:
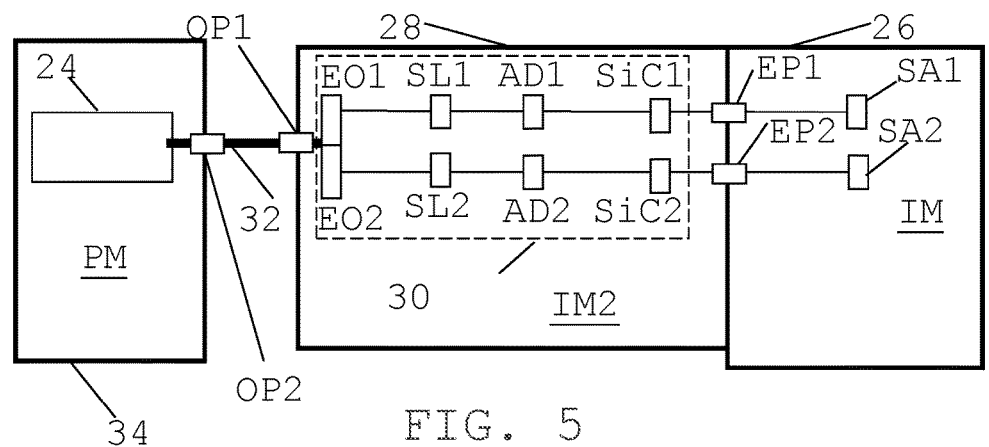
FIG. 5 shows the signal handling device in the second enclosure in more detail as connected to two sensors in the first enclosure and to the protection device in a third enclosure.

FIG. 4 schematically shows a penetrator PE. The penetrator is typically made up of or comprising a cable or conductor encircled by epoxy and/or glass in order to obtain sufficient insulation, protection and sealing.

A penetrator PE of a sealed electrical passage may pass through both the first enclosure wall and the second enclosure wall, which walls may furthermore be joined to each other. They may thus be abutting. There may furthermore be a single wall shared by both the first and second enclosure 26 and 28. Alternatively it is possible that each sealed electrical passage is made up of a pair of penetrators PE, where one penetrator of the pair goes through the first enclosure wall, while the other goes through the second enclosure wall. In this latter case the walls needed not to be abutting and the penetrators of a pair may also be interconnected by a cable.

The signal handling device 30 is in turn connected to the protection device 24 via a communication link 32, which communication link 32 is typically provided through a cable. It can thus be seen that the protection device is external to both the first and second enclosure and thus external to both the signal handling device 30 and power equipment 22. The cable may with advantage be an optical cable. Although also an electric cable may be contemplated. The communication link passes through a sealed communication link passage, which in this example is a first sealed optical passage $OP_1$. This may be provided through a penetrator as shown in FIG. 4, however with the electrical cable replaced by an optical cable.

As can be seen in FIG. 3, the first enclosure 26 has a closed environment that comprises a first insulating medium $IM_1$, which may be a medium such as transformer oil. It should however be realized that also other types of media may be contemplated such as SF6. The second enclosure 28 has a sealed environment comprising a second insulating medium $IM_2$, which protective medium in this case may be Nitrogen. Furthermore, the first enclosure 26 has a first pressure $P_1$, which may be the ambient pressure, i.e. the pressure at the seabed. The second enclosure 28 does on the other hand have a second lower pressure $P_2$, which may be the pressure of 1 atmosphere, i.e. the normal air pressure at sea level. It should be realized that the above described pressures are only examples of pressured that may be used.

The insulating media in the enclosures may be both gases as well as liquids.

The signal handling device 30 may handle the signals in a number of ways in order for them to be securely processed by the protection device 24. It may more particularly shape them before submission to the external protection device. FIG. 5 shows a number of different entities that provide different types of handling of the sensor signals. In FIG. 5 the handling of the primary and secondary sensors $SA_1$ and $SA_2$ of the first power supply line $L_1$ are shown as an example. It should be realized that the shown handling may be implemented in relation also to the other signals. In the shown example the conductor passing through the first sealed electrical passage $EP_1$ is connected to a first signal conditioner $SiC_1$ in the signal handling device 30, while the conductor passing through the second sealed electrical passage $EP_2$ is connected to a second signal conditioner $SiC_2$ in the signal handling device 30. The first signal conditioner $SiC_1$ is in turn connected to a first analogue to digital converter or A/D converter $AD_1$, while the second signal conditioner $SiC_2$ is connected to a second analogue to digital converter or A/D converter $AD_2$. The first A/D converter $AD_1$ is in turn connected to a first serializer $SL_1$ and the second A/D converter $AD_2$ is connected to a second serializer $SL_2$. Both serializers may be multiplexers.

The first serializer $SL_1$ is in turn connected to a first electro optical converter $EO_1$, while the second serializer $SL_1$ is connected to a second electro optical converter $EO_2$. Both these converters are finally connected to the communication link 32, which communication link in this case thus is an optical link or fiber-optic link. The optical link passes through the second enclosure wall via the first sealed optical passage $OP_1$ and then connects to the protection device 24 in a third enclosure 34 via a second sealed optical passage $OP_2$. The third enclosure 34, which may likewise be a canister, may then have the same closed environment in its interior as the second enclosure it may thus have the same second insulating medium $IM_2$ and the same pressure $P_2$.

In some variations of the invention there may be a protection circuit before a signal conditioner (not shown). Such a protective circuit may protect against too high levels of a sensor measurement. It may thus in the example given here be overvoltage protection or overcurrent protection. A signal conditioner SiC in turn conditions the received sensor measurement for providing a signal level that is suitable for the ensuing signal processing. It may more particularly adjust the signal to a shape that is suitable for the ensuing processing. This may involve amplifying or damping the signal in order to obtain a level that is suitable, for instance a level that is suitable for conversion into digital format without losing the signal content or without the signal content becoming too coarse.

In the case of sensors using current and voltage transformers, the signals from these cannot be connected directly to the A/D converter. To manage these signals isolation may furthermore be required, for instance using an isolation transformer.

The alternative to use current and voltage transformers are the use of current and voltage sensors, such as Rogowski coils and resistor networks. These usually produce a low-voltage, with a typical full-scale range up to some volts. This is however not a standard signal range for the protection devices either. In addition the low voltage signals are sensitive to noise.

Additionally it is quite common to measure other signals inside the switchgear using standard instruments that produce low-voltage or low-current signals, typically having full-scale range up to some volts or hundreds of mA respectively.

The signal handling device may also comprise the necessary isolation needed to connect directly to the protection device. A simple example is that the signal handling device would transform from instrument specific signals into standard I/O signals for example 4-20 mA.

The A/D converter in turns converts the analogue signal into a digital format and the serializer SL, which is optional, then serializes a number of such sensor signals from a sensor into a signal train that can be transmitted over the communication link 321.

Each electrical signal train is then converted into the optical domain by the electro optical converters $EO_1$ and $EO_2$ and transmitted over the communication link 32 to the protection device 24, for instance over separate fibers of the link. The communication link may be realized as a standard or proprietary optical industrial bus. However, it is as an alternative possible that the link is electrical or uses any other physical media. With this feature the signal transmission can be done very robust.

As was mentioned above, the serializer is optional. It may thus be omitted. It should here be realized that it is possible that also signal conditioning is omitted. It is also possible to omit A/D conversion, for instance if the signals are already digital or if digitalization can take place at the protection device. The serializing is, as is mentioned above, not necessary for optical signals. If optical signals are used it may for instance be possible to use multimode fibers and wavelength division multiplexing (WDM). It is also possible that the cable of the communication link comprises several optical fibers.

The material or diameter of the optical fiber can be any suitable material or diameter. Many different fibers are in use today and they are normally made around either a glass (silica) core or a plastic core. Around this core different coatings and protective layers are often added to get the requested behaviors of the fiber.

Both single-mode and multi-mode fibers can be used. However, single mode fibers are more common in long distance communication and probably less suitable than multi-mode fibers.

Any suitable communication protocol may be used for the communications between the signal handling device and the protection device. One or several protocols can be used and different protocols can be used for communication between different devices. These protocols can, as for electrical communication, be standardized or proprietary.

If the communication link is electrical, it is possible that there is only one serializer that forms a signal train of both measurements It can thus be seen that the signal handling device may comprise any combination of the described entities.

As discussed above, the enclosures may be separable from each other. For this reason it should also be realized that the above shown penetrators may also or additionally comprise connectors such as wet mates, i.e. connectors adapted to a wet environment. This may especially be desirable for the connection of the communication link 32 between the second and third enclosures 28 and 34 and thereby the second and third enclosures 28 and 34 may be replaceable. In this case either of or both the first and second sealed optical passages $OP_1$ and $OP_2$ may comprise a wet mate.

As mentioned above, the protection device 24 is provided for protecting the subsea installation SSI.

For this reason it is possible that the control signals for the control elements $S_1$, $S_2$, $S_3$, $S_4$ and $S_5$ are converted into the optical domain at the protection device 24 and supplied via sealed optical passages to a further enclosure or the second enclosure comprising an opto electrical converter converting the optical signal into the electric domain. The control signals may then be supplied therefrom to the control elements $S_1$, $S_2$, $S_3$, $S_4$ and $S_5$. As an alternative to optical signals from the protection device 24 it is possible with electric control signals. For this reason there may also be direct electrical connections between the protection device 24 and the electric power equipment 22 in the first enclosure 26.

Therefore, the protection device 30 may in the course of operation receive the electric or optical sensor signals from the equipment 22, possibly convert them to the electric domain, analyze them, and send one or more protection control signals to one or more protection elements $S_1$, $S_2$, $S_3$, $S_4$ and $S_5$ in the first enclosure 26 if the analysis indicates that protection is needed, which control signal makes the element disconnect a corresponding load, through disconnecting the corresponding power supply line from the switchgear.

It is for instance possible that the voltage and current of the first power supply line $L_1$ are detected by the primary and secondary sensors $SA_1$ and $SA_2$. The current and voltage are analyzed by the protection device 30 and if for instance the current is considered to be too high, indicating a short-circuit at the connected load, then the protection device 30 may determine that the corresponding protection element, i.e. the first switch $S_1$, should be opened. It may then transfer a control signal to the switch $S_1$, thereby opening it, whereby the rest of the subsea installation is protected from the fault. It should here be realized that a protection element may also comprise a circuit breaker. Furthermore, the control signals emitted by the protection device may be supplied to an intermediate device, which emits the actual control signals that are applied to the protection element. This may be needed if the control signal emitted by the protection device is too weak in order to operate the protection element.

In addition to these fiber-optic links there may still exist electrical couplings between the signal handling device and the protection device for power and/or communication.

The invention has a number of further advantages in addition to those already mentioned.

If current and voltage transformers are used as sensors, there is a problem in that disconnecting or short-circuiting the sensor will cause damage. A current transformer needs to be short circuited then disconnected to avoid open-load, and a voltage transformer is always equipped with a fuse to avoid short-circuit. This is especially a problem subsea where short-circuiting the current transformers and handling the fuse for voltage transformers becomes a very complex problem.

One advantage of the signal handling device is that for the current transformer the isolation transformer will always be connected, since it is mounted inside the switchgear. In addition the conductors from the sensors to the signal handling device reduce the risk of cable damage that can also cause open or short-circuited signal paths.

It is also possible that the signal handling device is shared by several pieces of power equipment. The combination of having one signal handling device adjacent the switchgear, which is shared by multiple sensors in different equipment is especially attractive when combined with digital encoding and transmission over a bus. This arrangement will drastically reduce the number of penetrators needed on the switchgear, hence reduce cost and potentially improve reliability.

Another possibility is that there is more than one signal handling device per piece of power equipment. In the case of a switchgear it is for instance possible with one signal handling device per power supply line. These may be provided in second enclosure or in separate enclosures that are different from the first enclosure. In this case it is also possible that each such signal handling device communicates with a corresponding protection device. As an alternative it is possible that there is one signal handling device, which communicates with several protection devices. In this latter case the sensor signals of one power supply line are sent to a corresponding protection device.

It is also possible that there is redundancy. In this case each sensor may be connected to two different signal handling devices. As an alternative there may two different sensors sensing the same property of the same part of the equipment. In relation to the described embodiment, there may thus be two signal handling devices, both in the second enclosure or in separate enclosures that are different from the first enclosure. There may also be two signal handling devices per power supply line, which can be placed in the same or different enclosures.

As yet another alternative it is possible that a signal handling device is placed in the first enclosure. This also means that there might be no sealed electrical conductor passages. Instead the sealed communication link passage passes through the wall of the first enclosure.

Building on this invention there is also a possibility to use the signal handling device to read other signals within the switchgear and hence reduce the number of needed physical connections even more. This can for example be to include interface to read measurements of temperature, leakage, pressure and water detection.

As mentioned above there may be more than one device in an enclosure, such as in the first, second or third enclosure. A signal handling device may for instance share the second enclosure with more than one other device, such as with another signal handling device, the protection device and/or the intermediate device. It is also possible that there are other devices in this common enclosure, such as a power supply device providing power that energizes these various other devices. The various devices may furthermore be provided on different circuit boards. According to one variation of the invention, at least some of the devices in such an enclosure are interconnected using an optical communication link. There may thus be optical communication links between two or more circuit boards in the common enclosure. This has the advantage of further reducing the required number of conductors between the devices. It also increases the communication bandwidth, makes the devices more resistant to electromagnetic interference as well as provides electric insulation between the devices.

There may also be communication between devices placed in different enclosures. For example the signals from the protection device in one enclosure to the intermediate device in a different enclosure can be carried out via a communication link, such as an optical communication link.

Furthermore, the protection device or the intermediate device may be interconnected with other parts of the subsea power system, such as controllers for the variable speed drives, by means of electrical or optical communication links.

The main benefits of the arrangement:
Simplify penetrators and connectors by reducing number of special signals that needs to be routed for current and voltage measurements
Increase signals quality and performance of subsea protection devices, by converting from noise sensitive signals to noise resistant signals close to source
Reduce number of penetrators and connectors, by combining output from many instruments on one digital bus.
Simplify qualification of subsea protection device, by removing large circuits needed for isolation from control canister.
Solving the issue of open-load conditions for Current Transformers
Reducing risk for short-circuit of Voltage transformers The functionality of the signal handling device and protective device may each be implemented in the form of one or more processors together with computer program memory including computer program code for performing this functionality. As one alternative the functionality may be provided in the form of one or more Field-Programmable Gate Arrays (FPGA). As yet another alternative it may be provided through Complex Programmable Logic Devices (CPLDs), or Digital Signal Processors (DSPs) or Erasable Programmable Logic Devices (EPLDs). Each device may also comprise more functionality than what has been described here.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A protection arrangement for inaccessibly located power distribution equipment, the arrangement comprising:
   a first sealed enclosure comprising:
      power equipment; and
      a group of sensors sensing physical properties of the power equipment, the first sealed enclosure being sealed to provide a closed environment for the power equipment; and
   a signal handling device connected to at least some of the sensors and to an external protection device via a communication link passing through at least one sealed communication link passage,
   wherein the signal handling device is configured to receive electrical sensor signals from the at least some of the sensors and shape the electrical sensor signals for submission to the external protection device, and
   wherein the external protection device has a connection to protection elements in the first sealed enclosure and is configured to receive sensor signals, analyse the sensor signals, and send one or more protection control signals for controlling one or more of the protection elements in the first enclosure if the analysis indicates that protection is needed, and wherein the protection elements are circuit breakers.

2. The protection arrangement according to claim 1, wherein the sensor signals comprise analogue sensor signals and the signal handling device comprises at least one analogue to digital converter converting analogue sensor signals to a digital format.

3. The protection arrangement according to claim 1, wherein the signal handling device comprises at least one signal conditioner configured to adjust the signal levels of at least some sensor signals to signal levels suitable for later processing.

4. The protection arrangement according to claim 1, wherein the signal handling device comprises at least one serializer configured to serialize sensor signals.

5. The protection arrangement according to claim 1, wherein the communication link is an optical communication link and the signal handling device comprises an electro-optical converter converting electrical sensor signals into one or more optical signals.

6. The protection arrangement according to claim 1, wherein the sensed properties comprise voltage and current and the sensors comprise one or more Rogowski coils and one or more resistive voltage dividing networks.

7. The protection arrangement according to claim 1, wherein the power equipment comprises a switchgear.

8. The protection arrangement according to claim 1, wherein the signal handling device is provided in a second sealed enclosure and the external protection device is provided in a third sealed enclosure.

9. The protection arrangement according to claim 8, wherein the third enclosure is placed at a same inaccessible location as the first and second sealed.

10. The protection arrangement according to claim 8, wherein the closed environment in the first sealed enclosure has a first pressure and the environment in the second sealed enclosure has a pressure that is lower than the first pressure.

11. The protection arrangement according to claim 8, wherein the first sealed enclosure is filled with a first insulating medium and the third sealed enclosure is filled with a second insulating medium.

12. The protection arrangement according to claim 9, wherein the inaccessible location is a seabed.

13. The protection arrangement according to claim 1, further comprising:
    a second sealed enclosure adjacent the first sealed enclosure and comprising the signal handling device, the second sealed enclosure being sealed to provide a closed environment for the signal handling device; and
    at least one sealed electrical conductor passage between the first and second enclosures, each of the at least one sealed electrical conductor passage comprising at least one penetrator through walls of the first and second sealed enclosures,
    wherein the first and second sealed enclosures are placed at a same inaccessible location and the signal handling device is connected to sensors in the first sealed enclosure via electrical conductors passing through said at least one sealed electrical conductor passage, and
    wherein said at least one sealed communication link passage passes through the wall of the second sealed enclosure.

14. The protection arrangement according to claim 13, wherein the closed environment in the first sealed enclosure has a first pressure and the environment in the second sealed enclosure has a second pressure that is lower than the first pressure.

15. The protection arrangement according to claim 13, wherein the first sealed enclosure is filled with a first insulating medium and the second sealed enclosure is filled with a second insulating medium.

16. The protection arrangement according to claim 1, wherein the signal handling device is placed in the first sealed enclosure and said at least one sealed communication link passage passes through a wall of the first sealed enclosure.

17. The protection arrangement according to claim 1, wherein the signal handling device is arranged in an enclosure together with at least one other device, said signal handling device and said at least one other device being interconnected using an electrical or optical communication link.

18. The protection arrangement according to claim 2, wherein the signal handling device comprises at least one signal conditioner configured to adjust the signal levels of at least some sensor signals to signal levels suitable for later processing.

* * * * *